United States Patent Office 3,378,465
Patented Apr. 16, 1968

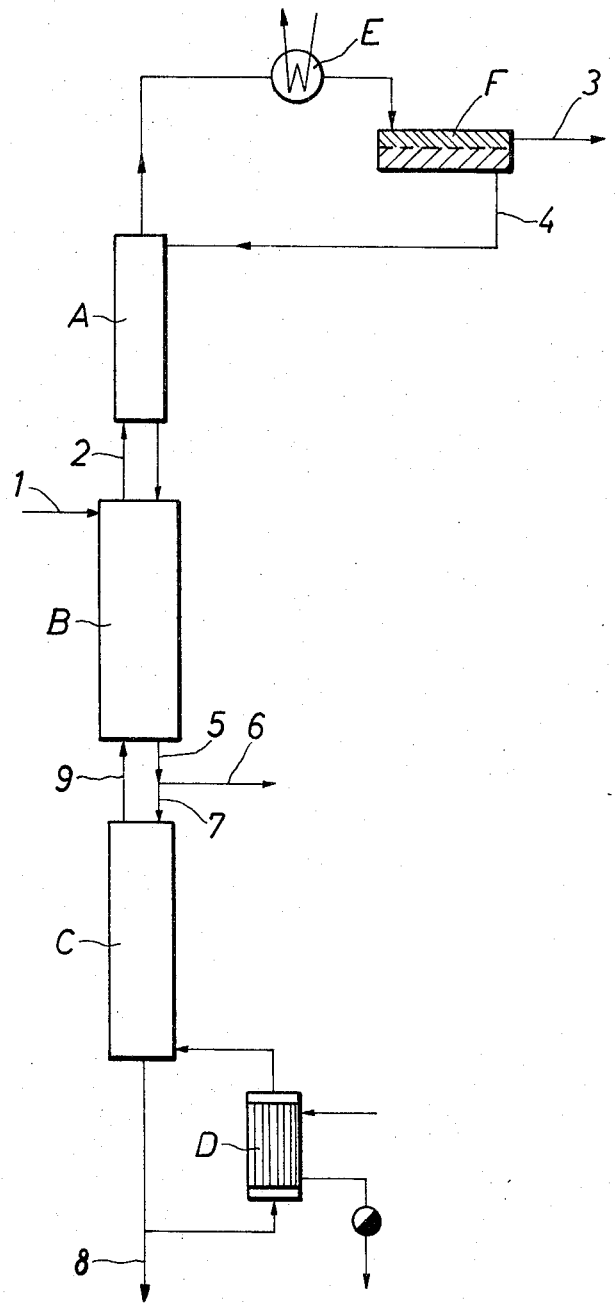

3,378,465
PURIFICATION OF SOLVENTS CONTAINING C$_5$ DIMERS BY AZEOTROPIC DISTILLATION WITH WATER
Hans-Walther Brandt, Cologne-Flittard, Bernhard Schleppinghoff, Dormagen, Feliks Bitners, Leverkusen, and Erich Meier, Cologne-Deutz, Germany, assignors to Farbenfabriken Bayer Aktiengesellschaft, and Erdalchemie Gesellschaft mit beschrankter Haftung, both of Leverkusen, Germany, both corporations of Germany
Filed Aug. 20, 1964, Ser. No. 390,918
Claims priority, application Germany, Aug. 28, 1963, E 25,424
7 Claims. (Cl. 203—25)

ABSTRACT OF THE DISCLOSURE

A process is disclosed for the regeneration of solvents used in the separation of hydrocarbons contained in the C$_5$ hydrocarbon fractions produced in the pyrolysis of mineral oils or their fractions, which comprises taking said spent solvent which contains C$_5$ dimers and subjecting the same to an azeotropic distillation with water. There is thereby obtained at the top of the column a fraction comprising water and C$_5$ dimers and a bottom fraction comprising solvent substantially free of C$_5$ dimers. A small portion of the C$_5$ dimer free solvent is subjected to a further distillation wherein there is obtained a bottom fraction comprising higher polymeric materials and decomposition products and a top fraction composed of vaporous substance completely regenerated solvent. The solvent vapors in accordance with the invention are thereafter introduced into the azeotropic distillation wherein the same serves to heat up further quantities of solvent to be treated by removal of C$_5$ dimers.

This invention relates to a process for the purification of solvents used in the separation of hydrocarbons obtained in the pyrolysis of mineral oils or their fractions.

When separating C$_5$ hydrocarbon mixtures (such as those obtained, for example, by the pyrolysis of mineral oils or their fractions, by means of a selective solvent such as N-methyl-pyrrolidone, the C$_5$-dienes, especially cyclopentadiene, form dimeric hydrocarbons which must be removed from the extraction agent which is carried in a cycle. In addition to the dimeric hydrocarbons, there are also produced polymers and decomposition products which make it necessary to regenerate a partial stream of the solvent.

In principle, it is possible to remove the dimeric hydrocarbons by distillation of a partial stream of the selective solvent. The dimers can be distilled over azeotropically, in the presence of water. Polymer and decomposition products must be removed from the solvent by distilling the latter in a second distillation. In this method, a concentration of dimers and polymers is established in the circulating solvent, which depends on the quantity of the partial stream that is subjected to the working up. This method has the disadvantage that with the normally large quantities of circulating solvent, only a very small partial stream of the solvent can be subjected to working up since otherwise a high expenditure, of energy and apparatus would be involved. However, if only a very small partial stream of the solvent is subjected to working up, there is an increase in the content of dimers in the circulating solvent and hence an increase in temperature, both these factors leading to a reduction in the selectivity, of the solvent.

It has now been found that the above disadvantages can be obviated and that the purication of selective solvents used in the separation of cracked C$_5$ hydrocarbon mixtures which contain C$_5$ dienes can be carried out if the C$_5$ dimers are removed from the solvent by azeotropic distillation with water, most of the solvent free from C$_5$ dimers is removed and a small partial stream of solvent free from C$_5$ dimers is evaporated to separate the difficultly volatile polymers and decomposition products, the solvent vapor being used for heating the solvent for the azeotropic distillation of the C$_5$ dienes.

As already mentioned, substances used as selective, solvents for the separation of C$_5$ hydrocarbon mixtures are, for example, N-methyl-pyrrolidone, butyrolactone, furfural or acetonitrile. In general, these selective solvents contain water or water is added to them in a quantity of, for example, 2 to 20%. When using N-methyl-pyrrolidone, the solvent preferably contains 3 to 7% of water. The process according to the invention may be carried out either in a column or in separate sections of columns.

To simplify the description of the process according to the invention, the process will be explained with reference to three separate sections of columns. The solvent may be introduced at the head of the central column section, part of the solvent may be introduced in the gaseous form into an upper column section from which a C$_5$ dimer/water mixture is removed overhead whilst solvent free from C$_5$ dimer flows back into the central section, the solvent free from C$_5$ dimer may largely be removed from the discharge of the central section, a part of the solvent free from C$_5$ dimers may be charged into a lower heated column section, polymers and decomposition products may be removed from the sump of this column section and the solvent vapor may be introduced into the central section. This embodiment will be described in detail with reference to the drawing:

The total stream of solvent from the outlet of the extractive distillation flows into section B of the distillation column through a duct 1. The gaseous head product flows through a duct 2 into the lower part of the column section A. At the head of the column part A, an azeotropic mixture of water and dimeric hydrocarbons is obtained. After its condensation in the cooler E, a diphasic mixture of dimers and water is formed in the separating vessel F. The upper hydrocarbon layer contains all the dimeric hydrocarbons contained in the solution inflow 1. The water obtained is returned as reflux to the column through a duct 4. In the case of a solvent which does not contain water, the water required for the azeotropic distillation can be added directly to the head of the column section A. In the discharge of the column section B (duct 5), a solvent free from dimer is obtained, which still contains small quantities of polymers as well as of decomposition products. The major part of the solvent from which dimers have been removed is returned to the extractive distillation through a duct 6. For the purpose of separating the high boiling polymers and decomposition products, a small portion of the stream from the duct 5, is supplied to the lower column section C through a duct 7, polymers and decomposition products being removed as sump product through a duct 8. The solvent vapor produced in sump boiler D is completely regenerated as it leaves the column part C through a duct 9 and serves also for heating up the column sections B and A and hence also for removing the dimeric hydrocarbons. The whole system of columns preferably operates in a vacuum.

EXAMPLE 1

In an experimental apparatus for separating C$_5$ hydrocarbons such as are obtained in the pyrolysis of a mineral oil fraction and using N-methyl-pyrrolidone containing 5% water as selective solvent, 93 kg./hour of solvent which must be subjected to working up are obtained at the discharge of the extractive distillation. The stream of product flows at a temperature of 100° C. into the upper part of column section B. This column section has a diameter of 150 mm. and in effect three bases. Above this column section there is a smaller column of a length of 300 mm. and a diameter of 30 mm., filled with Raschig rings of glass measuring 4 x 4 mm. The two columns are connected together by gas- and liquid-ducts. 420 g. of a dimer/water mixture are removed per hour over the top of the upper column. The temperature at the top is 67° C., the pressure 230 mm. Hg. In the separating container, 42 g. of dienes and 378 g. of water are obtained per hour and charged to the head of the column as reflux. Below the column section B there is a column C of filler bodies, having a height of 600 mm. and a diameter of 60 mm. This column is filled with glass Raschig rings 4 x 4 mm. 102.3 kg. of liquid are removed hourly from column section B through the duct 5, 92.95 kg. of which are removed as solvent free from dimers through the duct 6. The temperature at this point is 116° C. 9.3 kg. per hour of liquid discharge from column section B enter the lower column section C through the duct 7. The sump temperature of the lower column section is 180° C. 10 g. of polymer and decomposition products are removed per hour.

Similar results are obtained if instead of the N-methyl-pyrrolidone there are used acetonitrile, furfural or butyrolactone.

As used herein the term dienes shall be taken to mean isoprene, piperidene and cyclopentadiene; the term dimer shall be taken to mean dicyclopentadiene and the term $C_5$ dimer shall mean dicyclopentadiene.

We claim:
1. Process according to claim 7 which comprises using as solvent N-methyl-pyrrolidone.
2. Process as claimed in claim 1 which comprises using a N-methyl-pyrrolidone containing 3 to 7% of water.
3. Process according to claim 7 wherein said solvent contains from 2–20% of water.
4. Process according to claim 7 wherein said solvent is acetonitrile.
5. Process according to claim 7 wherein said solvent is furfural.
6. Process according to claim 7 wherein said solvent is butyrolactone.
7. Process for the purification of solvents selected from the group consisting of N-methyl-pyrrolidone, butyrolactone, furfural and acetonitrile used in the separation of hydrocarbons contained in $C_5$ hydrocarbon fractions produced in the pyrolysis of mineral oil and their fractions which comprises azeotropically distilling said solvent with water whereby there is obtained as the top fraction a product containing water and $C_5$ dimers, a bottom fraction comprising the solvent substantially free of $C_5$ dimers, distilling a small portion of said $C_5$ dimer free solvent to separate thereby a bottom fraction comprising polymers and decomposition products still contained in said solvent and a top fraction comprising vaporous substances completely regenerated solvent and introducing said solvent vapor into said azeotropic distillation wherein the same serves by heating up further quantities of solvent to be azeotropically distilled.

References Cited
UNITED STATES PATENTS

| | | | |
|---|---|---|---|
| 2,388,834 | 11/1945 | Douslin et al. | 203—93 |
| 3,012,947 | 12/1961 | Kelley et al. | 203—83 |
| 3,059,037 | 10/1962 | Cahn | 203—85 |
| 3,169,998 | 2/1965 | Rylander et al. | 260—674 |
| 3,210,259 | 10/1965 | Cornell et al. | 203—58 |
| 3,230,157 | 1/1966 | Hill et al. | 260—681.5 |
| 3,248,308 | 4/1966 | Haskell | 202—154 |

WILBUR L. BASCOMB, JR., *Primary Examiner.*

UNITED STATES PATENT OFFICE
CERTIFICATE OF CORRECTION

Patent No. 3,378,465                                  April 16, 1968

Hans-Walther Brandt et al.

It is hereby certified that error appears in the above numbered patent requiring correction and that the said Letters Patent should read as corrected below.

In the heading to the printed specification, lines 8 and 9, "Erdalchemie" should read -- Erdolchemie --. Column 1, line 43, insert a closing parenthesis after "fractions". Column 3, line 31, "1." should read -- 2. --; same line 31, claim reference numeral "7" should read -- 1 --; line 33, "2." should read -- 3. --; same line 33, claim reference numeral "1" should read -- 2 --; line 35, "3." should read -- 4. --; same line 35, claim reference numeral "7" should read -- 1 --. Column 4, line 1, "4." should read -- 5. --; same line 1, claim reference numeral "7" should read -- 1 --; line 3, "5." should read -- 6. --; same line 3, claim reference numeral "7" should read -- 1 --; line 5, "6." should read -- 7. --: same line 5, claim reference numeral "7" should read -- 1 --; line 7, "7." should read -- 1. --.

Signed and sealed this 11th day of November 1969.

(SEAL)
Attest:

EDWARD M.FLETCHER,JR.                      WILLIAM E. SCHUYLER, JR.
Attesting Officer                              Commissioner of Patents